July 4, 1961    C. W. CLARKE    2,991,006
AUTOMATIC FORCE BALANCE BRIDGE
Filed Sept. 16, 1957    7 Sheets-Sheet 1

INVENTOR
CYRIL WILLIAM CLARKE
BY Lawrence H. Paxton
AGENT

July 4, 1961  C. W. CLARKE  2,991,006
AUTOMATIC FORCE BALANCE BRIDGE
Filed Sept. 16, 1957  7 Sheets-Sheet 2

INVENTOR
CYRIL WILLIAM CLARKE
BY Lawrence H. Porter
AGENT

INVENTOR
CYRIL WILLIAM CLARKE

July 4, 1961  C. W. CLARKE  2,991,006
AUTOMATIC FORCE BALANCE BRIDGE
Filed Sept. 16, 1957  7 Sheets-Sheet 4

INVENTOR
CYRIL WILLIAM CLARKE
BY Lawrence H. Poston
AGENT

July 4, 1961    C. W. CLARKE    2,991,006
AUTOMATIC FORCE BALANCE BRIDGE
Filed Sept. 16, 1957    7 Sheets-Sheet 5

INVENTOR
CYRIL WILLIAM CLARKE
BY Lawrence H. Paxton
AGENT

July 4, 1961 C. W. CLARKE 2,991,006
AUTOMATIC FORCE BALANCE BRIDGE
Filed Sept. 16, 1957 7 Sheets-Sheet 6

INVENTOR
CYRIL WILLIAM CLARKE
BY Lawrence H. Patton
AGENT

United States Patent Office 2,991,006
Patented July 4, 1961

2,991,006
AUTOMATIC FORCE BALANCE BRIDGE
Cyril William Clarke, Bromley, England, assignor to The Foxboro Company, Foxboro, Mass., a corporation of Massachusetts
Filed Sept. 16, 1957, Ser. No. 684,329
Claims priority, application Great Britain Sept. 19, 1956
9 Claims. (Cl. 235—61)

This invention relates to automatic force balance devices, particularly applicable to analogue computers, and in particular computers for providing an output force which is the product or ratio of two input forces.

One object of the invention is to provide a computer that is particularly readily adaptable to the use of well known forms of "nozzle and flapper" devices, as used in a variety of automatic controlling and regulating systems.

According to the invention an automatic force balance device includes a first lever formed with a curved face and mounted to rock on a fulcrum, a second lever carrying the said fulcrum and pivoted about an axis on the concave side of the face, means for applying two variable forces to the first lever, to exert opposed turning moments thereon, and for applying a variable force to control the position of the second lever, and negative feed back means sensitive to movements of the first lever about its fulcrum for so determining one of the said three forces as to restore the equilibrium of the system after the equilibrium has been disturbed by variation of one or both of the other forces, the fulcrum or the point of application of one of the said two forces being arranged to travel along the curved face of the first lever when the second lever turns about its axis. The forces may be produced by pneumatic or hydraulic pressures acting in bellows, diaphragms, capsules or on pistons. Alternatively electro-magnetic means, such as solenoids, may be used to produce these forces.

The negative feed-back may be effected through the medium of a "nozzle and flapper," that is to say a nozzle and a member arranged to obstruct the escape of gas from the nozzle to a greater or lesser extent, the relative position between the nozzle and flapper being dependent on the angular position of the first lever, and the nozzle being arranged to control the pressure in the particular one of the bellows or the like which determines the said one of the forces for restoring the equilibrium of the system. Conveniently these bellows are supplied through a relay sensitive to the rate of escape of gas from the nozzle. The results of computations may be indicated by the second lever or by a receiver controlled thereby, such receiver being arranged, if desired, to control some process dependent on the computations.

When the invention is applied to an analogue computer, the question of whether the feed back means are to control the force associated with the fulcrum or one of the other two forces is determined by whether the result required is a ratio or a product.

In order that the invention may be clearly understood and readily carried into effect, some devices in accordance therewith will now be described, by way of example, with reference to the accompanying drawings, in which.

Figure 1:
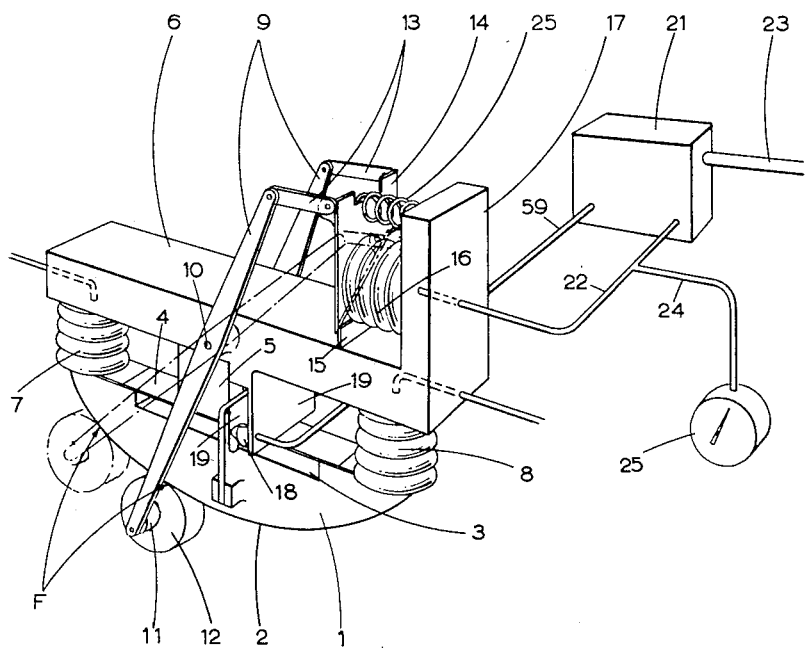
FIGURE 1 is a diagrammatic perspective view of one device.

In the example of FIGURE 1, the first lever 1 is arranged to turn, on a roller pivot 12 which provides a fulcrum point, in a vertical plane and its lower surface 2 is formed as a cylindrical arc, its upper surface being flat and formed along the major portion of its length with a rectangular recess 3, centrally disposed and of the same width as the lever, bridged by a resilient metal strip 4. The centre portion of this strip is fixed rigidly to a bracket 5 which, in turn, is fixed to a stationary support 6. Thus, the lever is mounted to swing to and fro in its own plane and to rise and fall slightly in that plane. Two bellows 7, 8 mounted respectively with their lower ends engaging the opposite ends of the lever 1, are interposed between the support 6 and the lever 1.

A second lever 9 is pivoted about a horizontal axis 10 to the support at the centre of curvature of the lower surface of the main or first lever (assuming the latter to be in the central or horizontal position). This second lever 9 is, in fact, divided into two parallel parts, one on each side of the first lever 1, and joined at their lower ends by a horizontal axle 11 on which is mounted a roller pivot 12 arranged to run on the arcuate face 2 of the main lever 1. The two parts of the second lever 9 also lie one on each side of the aforesaid support 6 and extend upwards from their axis 10 to points at which they are pivoted to parallel links 13, pivoted at their opposite ends to a plate 14, hinged by means of a flexible strip 15 to the support 6. A third bellows 16 is interposed between the remote face of this plate 14 and an upward extension 17 on the support 6. In this example, which is arranged to indicate the ratio or quotient of two values represented respectively by pressures in the first two bellows, the feed back means are associated with the third bellows 16 as adjustment means to move the pivot roller 12 along the lower curved surface of the main lever 1. These means comprise a fixed nozzle 18 mounted horizontally, parallel to the plane of the first lever 1 and to one side of the resilient strip, on a rigid element depending from the support 6. The tip of this nozzle 18 is halfway between the bellows 8 and the bellows 7, and a flapper 19, extending upwards in front of the nozzle 18, is fixed at its lower end to a bracket 20 at one side of the first lever 1. The nozzle 18 is connected to a relay 21 constructed substantially as described in British patent specification No. 670,427 and as described below with reference to FIGURE 3. The output lead 22 from the relay 21 is connected to the interior of the third bellows 16. A source of compressed air is connected to the relay through a pipe 23 and supplies both the nozzle 18 (by way of a pipe 59) and the output lead 22. The output lead has a branch 24 leading to a pressure gauge 25 graduated to give the results of the computations.

In operation, pressures corresponding to the numerator and denominator of a ratio are supplied respectively to the first two bellows 7, 8 and, assuming the first lever 1 is not already in a position corresponding to these pressures, the lever begins to turn in the vertical plane. This alters the relationship between the flapper 19 and nozzle 18 so that the resistance to the escape of the air streaming from the nozzle 18 is either increased or reduced. Thus, the third bellows 16 is either caused to expand or to contract under the action of a tension spring 25 interposed between the plate 14 and the upward extension 17 on the support 6. The expansion or contraction of the third bellows 16 is communicated to the second lever 9 which is swung so as to cause the roller 12 thereon to move in a direction such as to oppose the swinging movement of the first lever 1. The arrangement of the members is such that the first lever 1 undergoes some vertical movement on the resilient strip 4 during this action, in addition to the swinging movement. Ultimately the roller 12 settles in a position in which the parts are in equilbrium. On a moment arm calculation, $P_1 d_1 = P_2 d_2$, where $P_1$ and $P_2$ are the pressures in the first two bellows, and $d_1$ and $d_2$ are the moment arm lengths along the lever 1 from the first two bellows to the pivot point (fulcrum) of the roller 12 on the lever 1. The ratio of the moment arms about the roller 12 is then equal to the ratio of the forces exerted by the two bellows 7, 8 on the main lever. This may be expressed in terms of the above formula as $P_1/P_2 = d_2/d_1$. $P_3$ is the pressure in the third bellows 16. $P_3$ varies as the lever 1 is first tilted by a new value of $P_1$ or $P_2$ so that $P_3$ moves the roller 12 to a new balance position such that once more $P_1 d_1 = P_2 d_2$. Thus $P_3 = d_2/d_1$. Thus $P_3 = P_1/P_2$. That is, $P_3$ represents the ratio between $P_1$ and $P_2$. The pressure in the third bellows 16 is a function of this ratio and so the pressure gauge 25 indicates the appropriate ratio. The relationship between the pressure in the third bellows 16 and the quotient is not linear, although it is nearly linear close to the point where the second lever 9 is vertical that is to say, the point at which the quotient is unity. The non-linearity may be accommodated by graduating the gauge scale accordingly.

Figure 6:
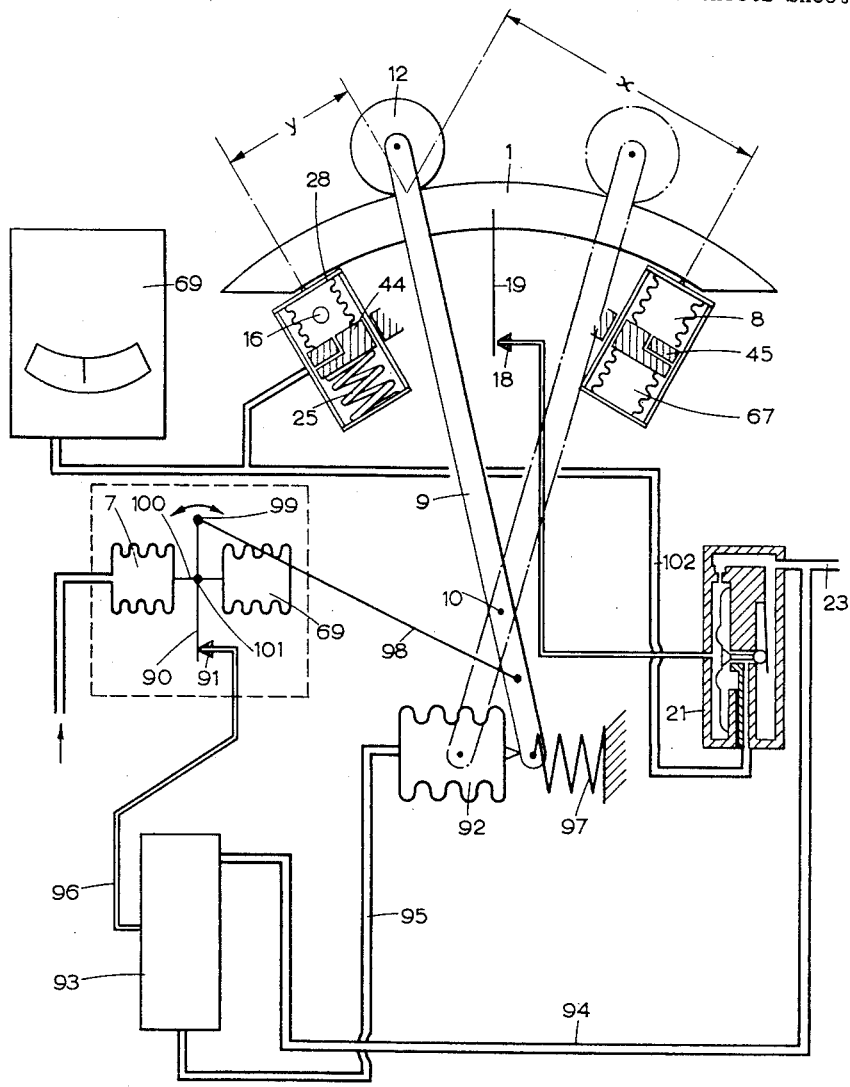
FIGURE 6 is a diagrammatic sectional elevation of a fourth device.

When a product is required, the input pressures corresponding to the two values to be multiplied together, are applied to one of the first two bellows 7 or 8 and to the third bellows 16. The nozzle 18, relay 21 and gauge 25 are then connected to the other one of the first two bellows 7 or 8. In terms of a rearrangement of FIGURE 1, $P_3 = P_1/P_2$. Thus with $P_1$ as the new output, $P_1 = P_2 P_3$, $P_1$ in this case representing the product of $P_2$ and $P_3$. A structure of specific illustration of a product system is shown in FIGURE 6.

Figure 2:
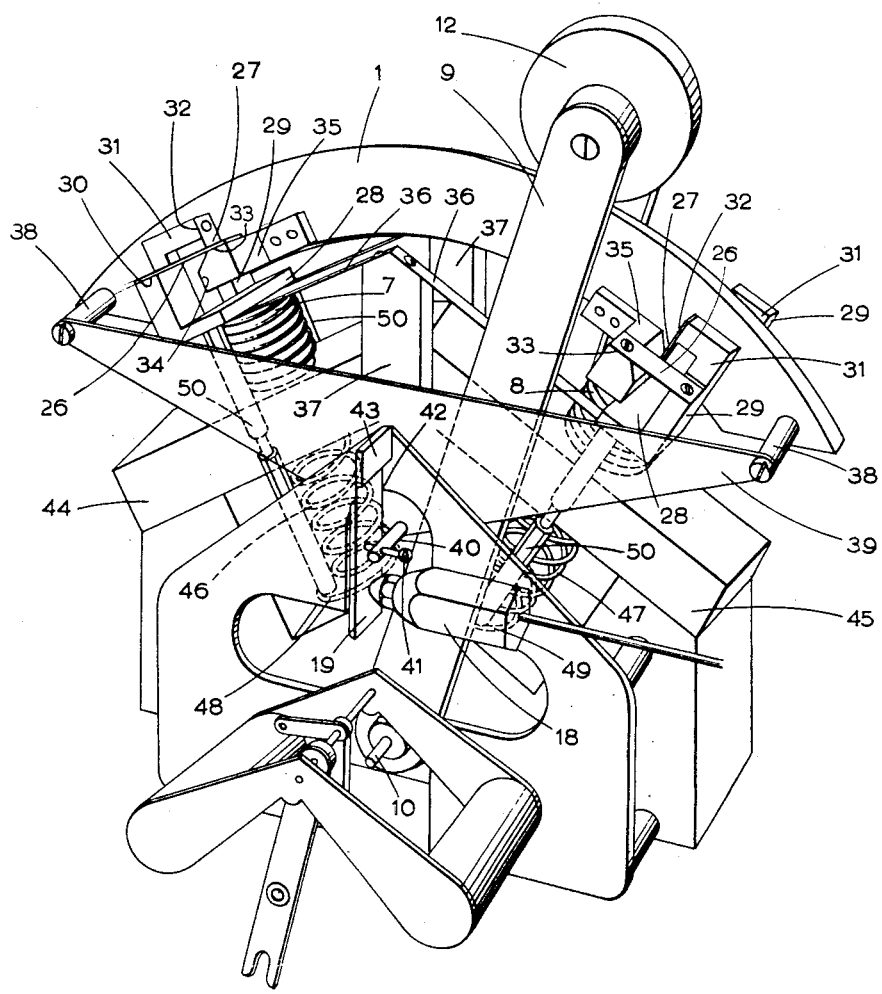
FIGURE 2 is a perspective view of part of a second device.
Figure 3:
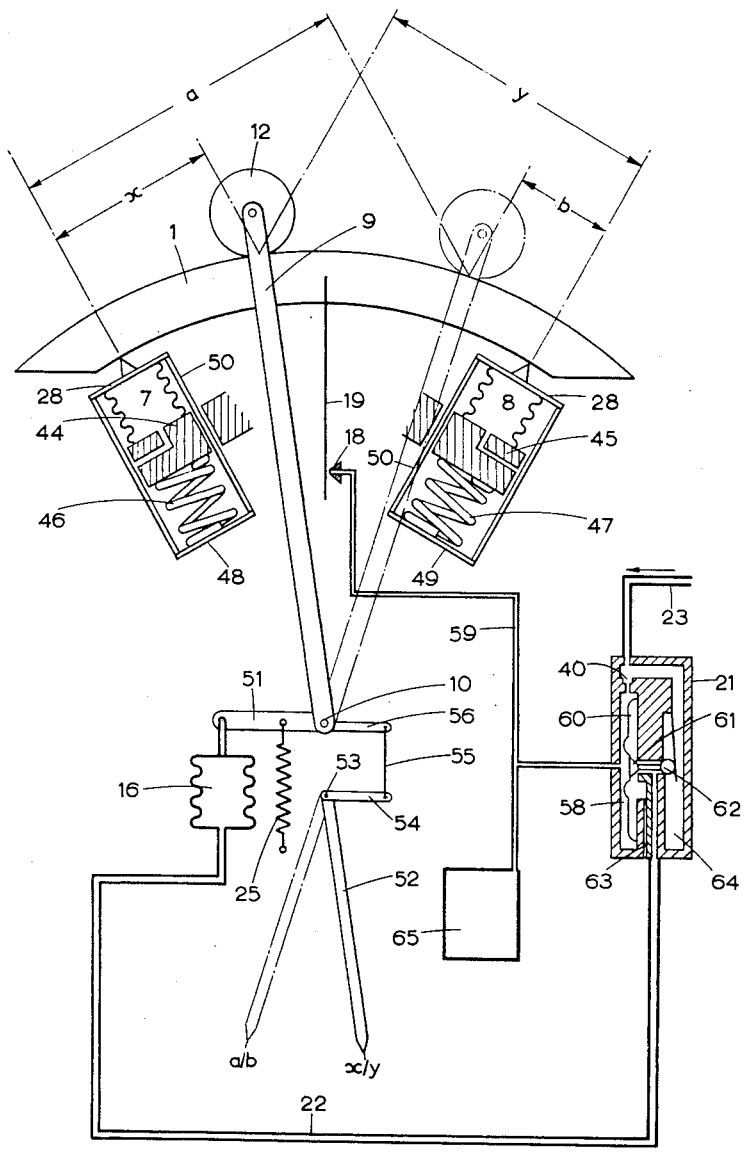
FIGURE 3 is a diagrammatic sectional elevation of the second device.

The device shown in FIGURES 2 and 3 is in many respects similar to that of FIGURE 1. However, the lever 1 is carried at its ends by pairs of cross-flexure leaf springs 26, 27 by which it is pivoted to the upper ends of the bellows 7, 8, these leaf-springs being omitted from FIGURE 3, wherein the pivots are indicated merely diagrammatically. At each end, a similar pair of cross-flexures 26, 27 is mounted on each side of the lever 1 and, for this purpose, a bridge piece 28 is mounted on top of each bellows. Each bridge piece 28 is formed with two upward extensions 29, one on each side of the lever 1. Each upward extension 29 is formed with a surface 30, parallel to the top of the bellows, and with a projection 31 presenting a surface 32 at right angles to the surface 30. The end of one of the flexures 26 is riveted to each surface 30 and the end of one of the flexures 27 is riveted to each surface 31. The opposite ends of each pair of flexures 26, 27 are riveted to surfaces 33, 34 on a member 35 fixed to the lever 1. The flexures in each pair of flexures 26, 27 are substantially at right angles to one another and out of contact with one another. Endwise translational, as distinct from rocking, movement of the lever 1, is prevented by two pairs of leaf springs 36 connected between central fixed members 37 one on each side of the lever 1, and the bridge pieces 28.

Fixed to the lever 1 by means of two projections 38 is a triangular plate 39 which has mounted thereon a projection 40 carrying an adjustable screw 41, transversely of the projection pin 40, that engages the flapper 19 for adjustment of the flapper 19. The latter includes a flexure 42 by which it is hinged to a fixed member 43.

Small movements of the lever 1, due to differential pressure variations in the bellows 7, 8, alter the separation between the flapper 19 and the nozzle 18. Initial adjustment of the separation between the flapper and nozzle, when the lever 1 is in its central or zero position is effected by adjusting the screw 41.

The lower ends of the bellows 8, 9 abut against the top surface of fixed rigid members 44, 45 which are part of the main supporting structure, and the forces exerted by the bellows depend not only on the pressures therein but also on helical compression springs 46, 47 interposed between the members 44, 45 and plates 48, 49. Each plate 48 or 49 is connected to the associated one of the bridge pieces 28 by a pair of tie rods 50, the rods in each pair being disposed on opposite sides of the associated one of the bellows 7, 8 and of the springs 46, 47. Each tie rod 50 is telescopically constructed so that its length may be adjusted by screwing one part into or out of the other part, lock nuts (not shown) being provided for locking the rods in adjusted condition. This enables the zero state of each bellows to be adjusted, as is required, when the condition corresponding to zero bellows force is not represented by zero pressure in the bellows but by some small pressure that has to be exactly balanced by the spring.

In certain applications of the invention, as when it is desired to multiply the ratio by a constant factor, the sizes of the bellows are different so that equal forces exerted respectively by the bellows are due to different pressures therein.

When the roller 12 is midway between the two bellows it makes contact with the lever 1 but with substantially no pressure and the bellows 7, 8 are contracted to their maximum extent. For all other values, the pressure in one or other or both bellows is increased.

Referring to FIGURE 3 it will be seen that the third bellows 16 acts on the lever 9 through a lever 51 fixed coaxially to the lever 9. An indication of the ratio of the forces due to the bellows 7, 8 is given by a pointer 52 pivoted about a fixed axis 53 and furnished with a lateral co-axial arm 54 connected by a link 55 to a lateral arm 56 fixed co-axially to the second lever 9.

Details of the relay 21 appear in FIGURE 3, from which it will be seen that the air entering the relay through the pipe 23 (the pressure being 20 p.s.i. gauge) is throttled as it passes through a constriction 57 to a space 58 in communication through the pipe 59 with a nozzle 18. One wall of the space 58 is constituted by a diaphragm 60 which is deflected to a greater or lesser extent according to the degree of proximity of the flapper 19 to the nozzle 18. Movement of the diaphragm 60 to the right moves a valve 61 towards its closed position and a valve 62 towards its fully opened position. The opposite movement of the diaphragm 60 opens the valve 61 and moves the valve 62 towards its closed position. The valve 61 controls the communication between the pipe 22 and an exhaust passage 63 and the valve 62 controls communication between the pipe 22 and the inlet pipe 23 through a space 64. A capacity tank 65 damps any large rapid fluctuation in the action of this device.

Figure 4:
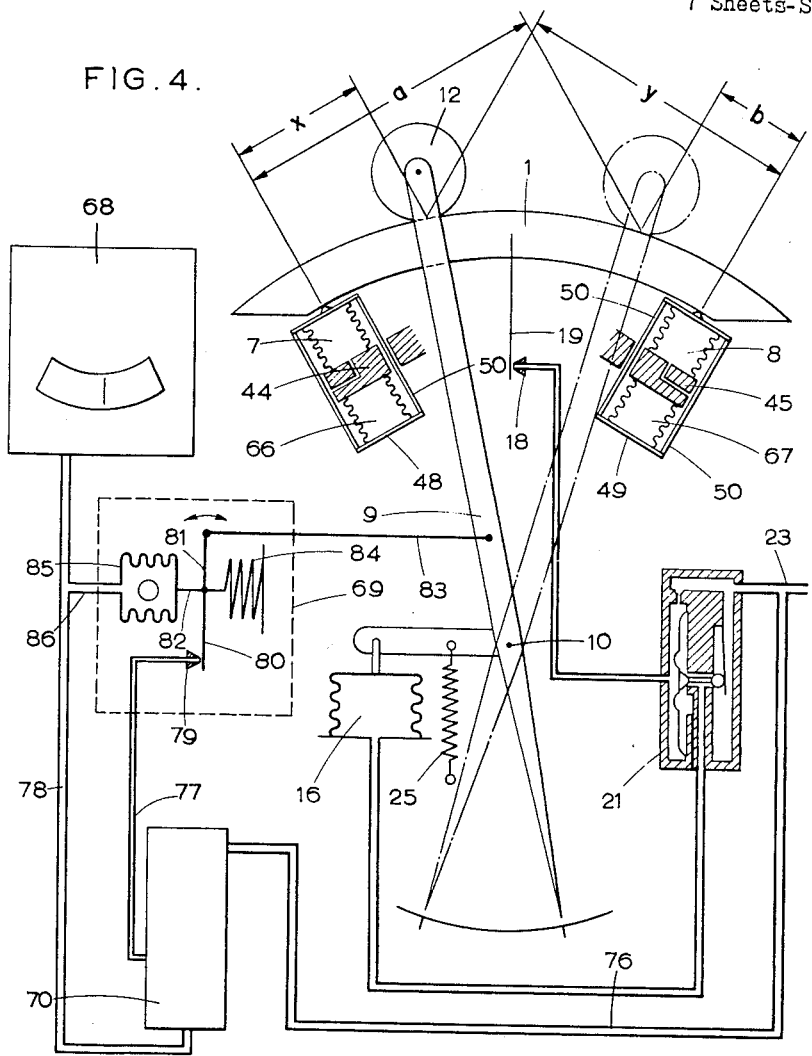
FIGURE 4 is a diagrammatic sectional elevation of a third device.

FIGURE 4 shows an arrangement similar to FIGURE 3 but with two important alterations. The first of these is the adaptation of the bellows 7, 8 to exert absolute pressures, thereby rendering them independent of ambient barometric conditions. For this purpose the springs 46, 47 of FIGURE 3 are replaced by evacuated bellows 66, 67, the ends of each of which are fixed respectively to the members 44, 45 and the plates 48, 49 so that the force due to the atmospheric pressure on the outside of the bellows 66, 67 augments the pressure within the bellows 7, 8 with the result that the forces applied to the first lever 1 are due to absolute pressures.

The second important alteration in FIGURE 4 consists in the provision of a receiver 68 controlled by a nozzle and flapper transmitter 69 and relay 70. The relay 70 furnishes amplified energy for the receiver 68, thereby enabling it, in addition to indicating the ratio of the two forces acting on the lever 1, to control some process dependent on this ratio. The relay 70 is of the same design as the relay 21 and is supplied with compressed air through a pipe 76 leading from the pipe 23. The receiver 68 is supplied through a pipe 78 and a pipe 77 supplies the nozzle 79 in the transmitter 69. The flapper 80 in this transmitter is pivoted at 81 to a member 82 and is moved about this pivot in sympathy with the second lever 9 by a link 83. The member 82 is interposed between a compression spring 84 and a bellows 85 and the negative feed-back necessary to stabilize the flapper 80 is supplied from the pipe 78 through a branch pipe 86 to the bellows 85.

Figure 5:
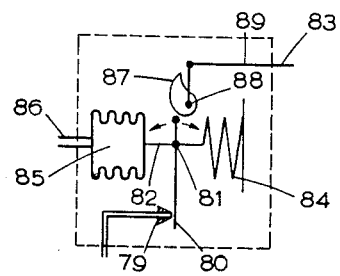
FIGURE 5 is a diagram showing a modification of part of the device of FIGURE 4.

The modification of FIGURE 5 shows means enabling the receiver 68 to be furnished with a uniform scale. These means include a cam 87 having a contour designed to compensate for the lack of a linear relationship between the displacements of the second lever 9 and the ratios represented thereby. The cam 87 is pivoted about a fixed axis 88 and acts on a follower at one end of the flapper 80. Movements corresponding to the movements of the second lever 9 are imparted to the flapper 80 by the link 83 which is pivoted to a lever 89 fixed to the cam 87. The cam 87 causes the flapper to turn about the axis 81. Movements of the member 82 due to the bellows 85 cause the flapper 80 to swing about the axis of the cam follower. For this purpose the cam 87 may in practice consist of a cam and countercam arrangement.

FIGURE 6 shows an adaptation of the arrangement of FIGURE 4 to the multiplication of factors; that is to say to the problem of multiplying together any two numbers within a given range. In FIGURE 6 one of the input bellows 8 and its associated evacuated bellows 67 are in the same positions as in FIGURE 4, but the other input bellows 7 and the associated evacuated bellows 69 are separated from the lever 1. In place of the bellows 7 the lever 1 is arranged to coact with the bellows 16 which, in this case, is interposed between the member 44 and the associated bridge-piece 28, and expands against the action of a compression spring 25.

In operating the arrangement of FIGURE 6, therefore, one of the factors, or some constant proportion or multiple thereof is represented as pressure in the bellows 8 and the other factor, or some constant proportion or multiple thereof, is represented as pressure in the bellows 7. When the pressure in the bellows 7 changes, the separation between a flapper 90 and a nozzle 91 changes. The pressure in a bellows 92, fed through a relay 93 similar to the relay 21, also changes, the relay 93 being fed with compressed air through a pipe 94 from the pipe 23, and connected to the bellows 92 through a pipe 95. A pipe 96 connects the nozzle 91 to the relay 93. The bellows 92, which acts against a compression spring 97, controls the position of the second lever 9 about its fixed axis 10. The movements of the lever 9 are stabilized by negative feed-back and, for this purpose, a link 98 connects the lever 9 to the flapper 90. The link 98 is pivoted to the flapper 90 at 99 and the flapper 90 is pivoted to a member 100, interposed between the bellows 7 and 69, at 101. Thus movement of the bellows 7 results in the flapper 90 turning about the axis 100 and movement of the second lever 9 results in the flapper 90 turning about the axis 101.

It will be seen that a change in the pressure in the bellows 7, or bellows 8, or both results in a new state of equilibrium being set up between the first and second levers 1, 9, such that the product is represented by the force on the bellows 16, this product being equal to the force due to the bellows 8 multiplied by the ratio $x/y$ which ratio, in turn, is proportional to the pressure in the bellows 7. However, the pressure in the bellows 16 is, of course not determined directly by the lever 1 but by the nozzle and flapper assembly 18, 19 acting through the relay 21, which is connected by a pipe 102 to the receiver 69 and to the bellows 16.

Figure 7:
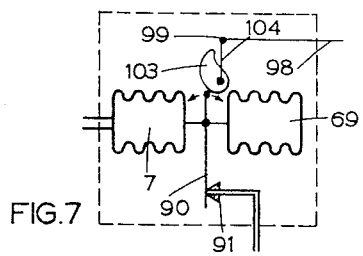
FIGURE 7 is a diagram showing a modification of part of the device of FIGURE 6.

FIGURE 7 shows a modification of FIGURE 6 arranged to produce a linear reaction in the receiver 69; that is to say equal increments in the product produce equal increments in the movement of the receiver index over the complete range of the instrument. In FIGURE 7 the cam 103 which results in these equal increments is similar to the cam 87 in FIGURE 5, but is applied to the flapper 90 controlled by the bellows 7, the link 98 being pivoted at 99 to a lever 104 fixed to the cam 103.

Figure 8:
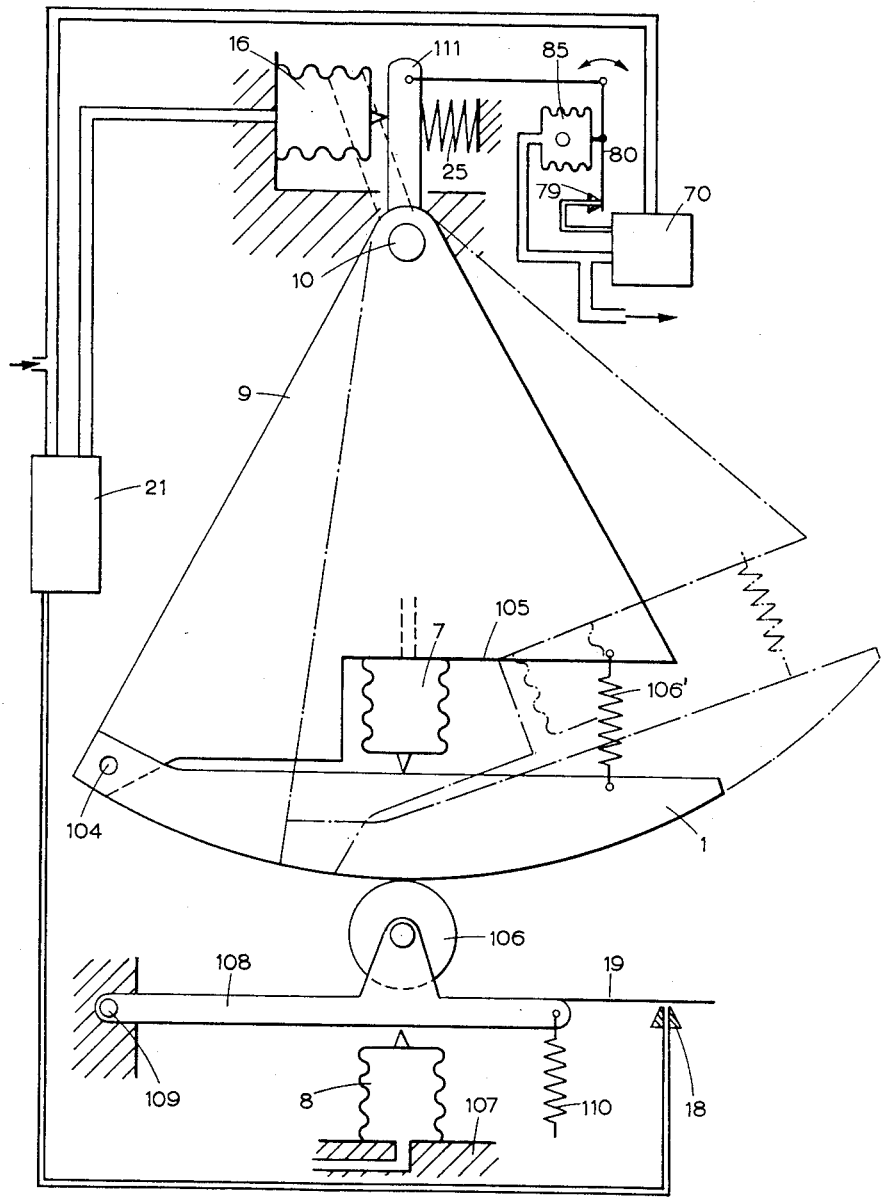
FIGURE 8 is a diagrammatic elevation of a fifth device.

FIGURE 8 shows a modification of the arrangement of FIGURE 3 in which the lever 1, with the cylindrical surface, is pivoted at one end at 104 to the lever 9 which, in this case, is an essentially triangular member pivoted about the fixed axis 10. One of the input bellows 7 is interposed between an abutment 105 on the lever 9 and the lever 1 with which it is in pivotal engagement. The bellows 7 expands against the action of a tension spring 106' interposed between the levers 1, 9. The fulcrum of the lever 1, in this case, is the pivot 104 and the roller 106, that runs on the cylindrical surface, is associated with the second input bellows 8, which is interposed between a fixed abutment 107 and a lever 108. The latter is pivoted about a fixed axis 109 and carries the roller 106. The bellows 8 are pivoted to the lever 108 and act against a tension spring 110. The line of action of the bellows 8 continuously passes substantially through the line of contact between the roller 106 and the lever 1 and through the axis 10. Thus, the lever 108 is merely a matter of convenience and may be replaced by any other device that permits rectilinear, or substantially rectilinear, movement of the roller 106 towards and away from the axis 10.

The bellows 16 moves the fulcrum to balance the forces of bellows 7 and 8. Thus bellows 16 performs the same function in FIGURES 1, 3, 5, and 8.

When the ratio is unity, the lines of action of the forces due to the bellows 7, 8 are colinear as shown in FIGURE 8 and the forces are equal. When, however, the force due to one of these bellows becomes greater than that in the other, the resultant of the two forces causes the lever 1 to swing about its fulcrum 104. If the lever 1 swings clockwise about the fulcrum 104, the reaction between the lever 1 and roller 106 causes, through the nozzle-baffle (18, 19) action and consequent pressure variance in bellows 16, the unit comprising the levers 1, 9 and the bellows 7 to swing counter-clockwise about the pivot 10. On the other hand, if the lever 1 is swung counter-clockwise about the fulcrum 104, the reaction between the lever 1 and roller 106, as felt in bellows 16, causes the unit comprising the levers 1 and 9 and the bellows 7 to swing clockwise. In either event, the separation between the flapper 19, which in this example is carried by the lever 108, and the nozzle 18 is adjusted. This controls the pressure in the bellows 16 through the relay 21. The bellows 16 act pivotally on an extension 111 of the lever 9, against the action of a compression spring 25. A receiver (not shown) is operated in accordance with the position of the lever 9 through the medium of apparatus the same as shown in FIGURE 4 and including a nozzle 79, a flapper 80, a relay 70, a bellows 85, and a feed-back link 83. This assembly may be modified to give linear readings by the inclusion of a cam as shown in FIGURE 5.

In FIGURE 8, when an equilibrium condition is reached, the ratio of the forces due to the bellows 7, 8 is equal to the inverse ratio of the moment arms about the fulcrum 104 and as both forces are on the same side of the fulcrum they are arranged to act, as described above, in opposed directions.

Figure 9:
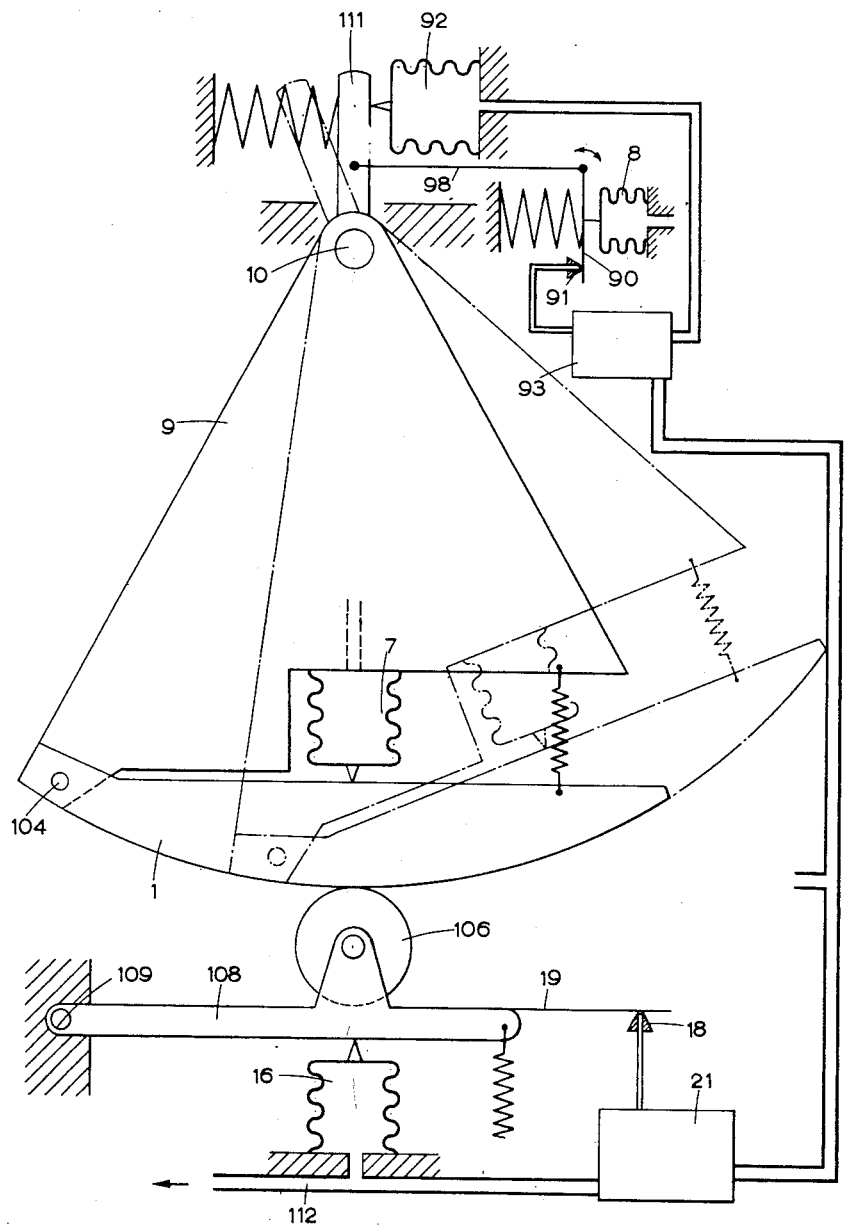
FIGURE 9 is a diagrammatic elevation of a sixth device.

FIGURE 9 shows the adaptation of the arrangement of FIGURE 8 to the problem of multiplying together any two numbers within a given range. The output bellows 16 in FIGURE 9 take the place of the input bellows 8 in FIGURE 8. In FIGURE 9 the input bellows 8, as in FIGURE 6, control a flapper 90 that co-operates with a nozzle 91 to control a bellows 92 through the medium of a relay 93. The bellows 92 act on the extension 111 of the lever 9, and the feed-back to the flapper 90 is provided by the link 98. The pressure in the bellows 16 is controlled according to the separation between the flapper 19 and nozzle 18, through the medium of the relay 21. This pressure is also applied to the receiver (not shown) through a pipe 112. It will be seen that the action of the pneumatic circuit is the same as that of FIGURE 6. Cam compensation for non-linearity may be incorporated in the device of FIGURE 9 in the same way as in FIGURE 7.

In FIGURES 8 and 9 the bellows 7, 8 may be associated with evacuated bellows as in FIGURES 4 and 6.

It will be appreciated that the cams used in certain of the constructions described above to provide a linear output to the receiver may be replaced by other cams providing non-linear but other predetermined functions of the ratio or product.

In all the constructions described above, as is usual in nozzle and flapper devices, the relative movement between the nozzle 18 and flapper 19 is minutely small. On the other hand the excursions of the roller 12 or 106 along the cylindrical surface of the lever 1 are comparatively very large. This means that the instruments have great sensitivity. In the examples shown in the drawings, the radius of curvature of the cylindrical surface on the lever 1 is made equal to the radial distance between the axis 10 and the point of contact between the roller and cylindrical surface, when the conditions are such that the roller is midway between the two bellows 7, 8 (FIGURES 1 to 7) or when the bellows are in axial alignment (FIGURES 8 and 9).

I claim:

1. An automatic force balance device comprising, in combination, a single lever with a convex face as a peripheral arc of a circle, a fulcrum about which said lever is pivotable, means for applying two variable forces to said lever in opposition to each other about said fulcrum, a fulcrum support arm, a fixed location pivot for said fulcrum support arm with said pivot essentially at the center of said circle when said lever is in a given position, means for moving said fulcrum to produce relative adjustment movement along said convex face between said fulcrum and the point of application of one of said two forces to said lever, said movement means including means for applying a third variable force to move said fulcrum support arm about its pivot, and feed-back means comprising a sensing unit with means for affecting said sensing unit in accordance with movements of said lever about said fulcrum, for establishing one of said three forces from said sensing unit as an output force which restores equilibrium in said device after its equilibrium has been disturbed by variation of at least one of the others of said forces.

2. An automatic force balance device comprising, in combination, a single lever with a convex face as a peripheral arc of a circle, fulcrum means about which said lever is pivotable, means for applying two variable forces to said lever in opposition to each other about said fulcrum means, a fixed radius support arm for said fulcrum means, a fixed location pivot for said fulcrum support arm with said pivot essentially at the center of said circle when said lever is in a given position, means for moving said fulcrum means to produce relative adjustment movement between said fulcrum means and the point of application of one of said two forces to said lever, said movement means including roller means movable along said convex face and means for applying a third variable force to move said fulcrum support arm about its pivot, and negative feed-back means comprising a sensing unit and a relay unit, means for affecting said sensing unit in accordance with movements of said lever about said fulcrum means, for establishing one of said three forces, through said relay unit and from said sensing unit, as an output force which restores equilibrium in said device after its equilibrium has been disturbed by variation of at least one of the others of said forces.

3. An automatic force balance device comprising, in combination, a single lever with a convex face as a peripheral arc of a circle, a roller fulcrum on said face about which said lever is pivotable, means for applying two variable forces to said lever in opposition to each other about said fulcrum, a fixed radius support arm for said roller fulcrum, a fixed location pivot for said fulcrum support arm with said pivot essentially at the center of said circle when said roller is in a central position on said lever, means for moving said fulcrum to produce relative adjustment movement between said roller fulcrum and the point of application of one of said two forces to said lever, said movement means including means for applying a third variable force to move said roller fulcrum support arm about its pivot and thus to move said roller along said convex lever face, and negative feed-back means comprising a sensing unit and a relay unit, means for affecting said sensing unit in accordance with movements of said lever about said fulcrum, for establishing, through said relay unit and from said sensing unit, one of said two variable forces as applied to said lever as an output force which restores equilibrium in said device after its equilibrium has been disturbed by variation of at least one of the others of said forces, said output force thus being provided as a product of the other two forces.

4. An automatic force balance device comprising, in combination, a single lever with a convex face as a peripheral arc of a circle, a roller fulcrum on said face about which said lever is pivotable, means for applying two variable forces to said lever in opposition to each other about said fulcrum, a fixed radius support arm for said roller fulcrum, a fixed location pivot for said fulcrum support arm with said pivot essentially at the center of said circle when said roller is in a central position on said lever, means for moving said fulcrum to produce relative adjustment movement between said roller fulcrum and the point of application of one of said two forces to said lever, said movement means including means for applying a third variable force to move said roller fulcrum support arm about its pivot and thus to move said roller along said convex lever face, and negative feed-back means comprising a sensing unit and a relay unit, means for affecting said sensing unit in accordance with movements of said lever about said fulcrum, for establishing said third force, through said relay unit and from said sensing unit, as an output force which restores equilibrium in said device after its equilibrium has been disturbed by variation of at least one of said two variable forces, said third force thus being provided as a ratio of said two variable forces.

5. An automatic force balance device comprising, in combination, a single lever with a convex face as a peripheral arc of a circle, a roller fulcrum on said face about which said lever is pivotable, means for applying two variable forces to said lever in opposition to each other about said fulcrum, a fixed radius support arm for said roller fulcrum, a fixed location pivot for said fulcrum support arm with said pivot essentially at the center of said circle when said roller is in a central position on said lever, means for moving said fulcrum to produce relative adjustment movement between said roller fulcrum and the point of application of one of said two forces to said lever, said movement means including means for applying a third variable force to move said roller fulcrum support arm about its pivot and thus to move said roller along said convex lever face, and negative feed-back means comprising a sensing unit and a relay unit, means for affecting said sensing unit in accordance with movements of said lever about said fulcrum, for establishing one of said three forces, through said relay unit and from said sensing unit, as an output force which restores equilibrium in said device after its equilibrium has been disturbed by variation of at least one of the others of said forces.

6. An automatic force balance device comprising, in combination, a single lever with a convex face as a peripheral arc of a circle, fulcrum means at one end of said lever about which said lever is pivotable, means for applying two variable forces to said lever in opposition to each other about said fulcrum means, a fixed radius support arm for said fulcrum means, a fixed location pivot for said fulcrum support arm with said pivot essentially at the center of said circle when said lever is in a given position, means for moving said fulcrum to produce relative adjustment movement between said fulcrum means and the point of application of one of said two forces to said lever by moving said lever, said fulcrum and said fulcrum support together as a unit about said fulcrum support pivot, roller means movable along said convex face as an aid to said movement and through which one of said two variable forces is applied to said lever and mean for applying a third variable force to move said fulcrum support arm about its pivot, and negative feed-back means comprising a sensing unit and a relay unit, means for affecting said sensing unit in accordance with movements of said lever about said fulcrum means, for establishing one of said three forces, through said relay unit and from said sensing unit, as an output force which restores equilibrium in said device after its equilibrium has been disturbed by variation of at least one of the others of said forces.

7. An automatic force balance device comprising, in combination, a single lever with a convex face as a peripheral arc of a circle, fulcrum means about which said lever is pivotable, bellows means for applying two variable forces to said lever in opposition to each other about said fulcrum means, a fixed radius support arm for said fulcrum means, a fixed location pivot for said fulcrum support arm with said pivot essentially at the center of said circle when said lever is in a given position, means for moving said fulcrum to produce relative adjustment movement between said fulcrum means and the point of application of one of said two forces to said lever, roller means movable along said convex face as an aid to said movement and bellows means for applying a third variable force to move said fulcrum support arm about its pivot, negative feed-back means comprising a sensing unit and a relay unit, means for affecting said sensing unit in accordance with movements of said lever about said fulcrum means, for establishing one of said three forces, through said relay unit and from said sensing unit, as an output force which restores equilibrium in said device after its equilibrium has been disturbed by variation of at least one of the others of said forces, a mechanical linkage from said fulcrum support arm, a linearizing cam operated by said linkage, a pneumatic transmitter operated through said linkage and cam, and an indicating instrument for receiving and responding to the output of said transmitter.

8. An automatic force balance device comprising, in combination, a single lever in the form of a segment of a circle with a convex face as a peripheral arc of the circle, fulcrum means about which said lever is pivotable at one end of said lever, means for applying two variable forces to said lever in opposition to each other about said fulcrum means, a fixed radius support arm for said fulcrum means, a fixed location pivot for said fulcrum support arm with said pivot essentially at the center of said circle when said lever is in a given position, means for moving said fulcrum means to produce relative adjustment movement between said fulcrum means and the point of application of one of said two forces to said lever, roller means movable along said convex face as an aid to said movement and means for applying a third variable force to move said fulcrum support arm about its pivot, and negative feed-back means comprising a sensing unit and a relay unit, means for affecting said sensing unit in accordance with movements of said lever about said fulcrum means, for establishing one of said three forces, through said relay unit and from said sensing unit, as an output force which restores equilibrium in said device after its equilibrium has been disturbed by variation of at least one of the others of said forces.

9. An automatic force balance device comprising, in combination, a single lever essentially in the form of a segment of a circle with a convex face as the peripheral arc of the circle, a fulcrum about which said lever is pivotable, comprising a roller on said convex face and carried by an arm pivoted at the center of said circle when said roller is at the mid-point of said arc, means for applying two variable forces to said lever in opposition to each other about said fulcrum in the form of a bellows at each end of said arc, a fixed radius support arm for said fulcrum, a fixed location pivot for said fulcrum support arm with said pivot essentially at the center of said circle when said lever is in a given position, a fixed body on which said pivot and said bellows are mounted, flexure means as the mounting of said lever, with said mounting based on said fixed body and said flexure means comprising a strip in chord form on said segment lever with the central portion of said flexure connected to said fixed body to provide said mounting, means for moving said fulcrum to produce relative adjustment movement between said fulcrum and the point of application of one of said two forces to said lever, said movement means including a bellows for applying a third variable force to move said fulcrum support arm about its pivot and said roller along said convex lever face, and negative feed-back means comprising a pneumatic sensing and relay unit, means for affecting said sensing and relay unit in accordance with movements of said lever about said fulcrum, for establishing, through said sensing and relay unit, one of said three forces as an output force which restores equilibrium in said device after its equilibrium has been disturbed by variation of at least one of the others of said forces.

References Cited in the file of this patent

UNITED STATES PATENTS

| | | |
|---|---|---|
| 2,643,055 | Sorteberg | June 23, 1953 |
| 2,736,199 | Ibbott | Feb. 28, 1956 |